United States Patent
Wang et al.

(10) Patent No.: US 9,941,969 B2
(45) Date of Patent: Apr. 10, 2018

(54) METHOD FOR CONTROLLING MODULATION DEPTH OF PILOT SIGNAL, TRANSMITTER, AND PILOT LOCKING APPARATUS

(71) Applicant: Huawei Technologies Co., Ltd., Shenzhen (CN)

(72) Inventors: Juan Wang, Shenzhen (CN); Ning Deng, Shenzhen (CN); Xiaodong Luo, Chengdu (CN); Zhiyong Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/282,697

(22) Filed: Sep. 30, 2016

(65) Prior Publication Data

US 2017/0026132 A1    Jan. 26, 2017

Related U.S. Application Data

(63) Continuation of application No. PCT/CN2014/074476, filed on Mar. 31, 2014.

(51) Int. Cl.
*H04B 10/04* (2006.01)
*H04B 10/50* (2013.01)
(Continued)

(52) U.S. Cl.
CPC ..... *H04B 10/5057* (2013.01); *H04B 10/0795* (2013.01); *H04B 10/541* (2013.01); *H04B 2210/075* (2013.01)

(58) Field of Classification Search
CPC .......... H04B 10/5057; H04B 10/50572; H04B 10/50577; H04B 10/564; H04B 10/541;
(Continued)

(56) References Cited

U.S. PATENT DOCUMENTS 6,046,838 A * 4/2000 Kou ..................... G02F 1/0516
359/239
6,553,211 B1    4/2003 Zhou
(Continued)

FOREIGN PATENT DOCUMENTS

CN    1523400 A    8/2004
CN    101340241 A    1/2009
(Continued)

OTHER PUBLICATIONS

Li, "Research on Pilot-Tone Based on High Speed DWDM System," A Master Thesis Submitted to University of Electronic Science and Technology of China, School of Communication & Information Engineering, Jun. 14, 2013, 75 pages.

*Primary Examiner* — Hanh Phan
(74) *Attorney, Agent, or Firm* — Slater Matsil, LLP

(57) ABSTRACT

A transmitter includes a pilot loading apparatus, an optical modulator, and a pilot locking apparatus. The pilot locking apparatus is configured to determine a pilot operating point that is currently on a response curve and that is of the optical modulator, and a target initial amplitude of an electrical pilot signal. The pilot locking apparatus is further configured to control the pilot loading apparatus to adjust an initial amplitude of the electrical pilot signal to the target initial amplitude.

19 Claims, 5 Drawing Sheets

(51) Int. Cl.
*H04B 10/079* (2013.01)
*H04B 10/54* (2013.01)

(58) Field of Classification Search
CPC .......... H04B 10/5161; H04B 10/50593; H04B 10/50595; H04B 10/516
USPC ....... 398/183, 186, 187, 188, 192, 193, 194, 398/195, 196, 197, 198, 199, 33, 38, 25; 359/237, 238, 239, 245, 247, 248, 276, 359/279
See application file for complete search history.

(56) References Cited

U.S. PATENT DOCUMENTS

| | | |
|---|---|---|
| 6,556,728 B2 | 4/2003 | Olesen |
| 2009/0324252 A1 | 12/2009 | Nagayama et al. |
| 2011/0164300 A1 | 7/2011 | Shen |
| 2013/0028614 A1* | 1/2013 | Ishii ................ H04B 10/50595 398/187 |
| 2014/0016172 A1 | 1/2014 | Khatana et al. |

FOREIGN PATENT DOCUMENTS

| | | |
|---|---|---|
| CN | 101354515 A | 1/2009 |
| CN | 101800598 A | 8/2010 |
| EP | 1439644 A1 | 7/2004 |
| JP | 2009258441 A | 11/2009 |
| JP | 5367299 B2 | 12/2013 |
| WO | 0126256 A1 | 4/2001 |
| WO | 2008111223 A1 | 9/2008 |

\* cited by examiner

US 9,941,969 B2

METHOD FOR CONTROLLING MODULATION DEPTH OF PILOT SIGNAL, TRANSMITTER, AND PILOT LOCKING APPARATUS

CROSS-REFERENCE TO RELATED APPLICATIONS

This application is a continuation of International Application No. PCT/CN2014/074476, filed on Mar. 31, 2014, the disclosure of which is hereby incorporated by reference in its entirety.

TECHNICAL FIELD

The present disclosure relates to the communications field, and in particular embodiments, to a method for controlling a modulation depth of a pilot signal, a transmitter, and a pilot locking apparatus.

BACKGROUND

Optical channel status detection refers to disposing optical components at position points on an optical communications network to monitor and measure performance of an optical channel, to obtain a status of the entire optical network, and provide a basis for managing and maintaining the network. A pilot is an important means of detecting a status of an optical channel. Specifically, a process of detecting a status of an optical channel by using a pilot is as follows. A pilot signal is modulated on a transmitted signal on a to-be-detected optical channel, so that the pilot signal is transmitted on the optical network along with the transmitted signal, and then related information about the pilot signal is detected at a status detection point of the optical channel, to determine a current status of the optical channel. The pilot signal has a feature that is consistent with that of the transmitted signal. Therefore, after detection is performed on information such as a frequency and an amplitude of the pilot, current performance information of the transmitted signal on the optical communications network can be learned, that is, the status of the optical channel is determined. An amplitude of the pilot signal corresponds to power of the transmitted signal in real time, which ensures stability and predictability of a pilot modulation depth, and is a prerequisite for ensuring effective detection on the status of the optical channel.

Currently, to ensure stability and predictability of a pilot modulation depth, power of a service flow signal and power of a pilot on an optical network channel are learned by using a feedback loop, to measure, adjust, and lock the pilot in real time. However, if a pilot signal is loaded, in a digital driver or a Digital Signal Processing (DSP) chip of a transmitter, into the service flow signal in a scrambling manner, and then is modulated by using an Mach-Zehnder (MZ) modulator, the pilot loses, due to a non-linear feature of the MZ modulator, a linear relationship with a pilot feature that is initially applied. A parameter such as an amplitude of the pilot signal cannot be quickly and effectively adjusted by using an existing mechanism. Consequently, a status of the optical channel cannot be correctly detected.

SUMMARY

Embodiments provide a method for controlling a modulation depth of a pilot signal, a transmitter, and a pilot locking apparatus, which can quickly and effectively adjust a pilot modulation depth, thereby ensuring accuracy of detecting a status of an optical channel.

According to a first aspect, an embodiment provides a transmitter, including a pilot loading apparatus, configured to generate an electrical pilot signal, and load the electrical pilot signal into an electrical service flow signal. The transmitter also includes an optical modulator, configured to modulate, the electrical service flow signal into which the electrical pilot signal is loaded, onto an optical signal, to generate an optical service flow signal. The transmitter further includes a pilot locking apparatus, configured to determine a target initial amplitude of the electrical pilot signal and a pilot operating point that is currently on a response curve and that is of the optical modulator, and control the pilot loading apparatus to adjust an initial amplitude of the electrical pilot signal to the target initial amplitude, where if a value of the pilot operating point is less than a first threshold, the target initial amplitude of the electrical pilot signal is determined based on a correspondence between a modulation depth of a one-frequency-multiplication component of an optical pilot signal that is output after the electrical pilot signal is modulated by the optical modulator and the initial amplitude of the electrical pilot signal, and a target modulation depth of the optical pilot signal; or if a value of the pilot operating point is greater than or equal to a first threshold, the target initial amplitude of the electrical pilot signal is determined based on a correspondence between a modulation depth of a two-frequency-multiplication component of an optical pilot signal that is output after the electrical pilot signal is modulated by the optical modulator and the initial amplitude of the electrical pilot signal, and a target modulation depth of the optical pilot signal.

With reference to the first aspect, in a first implementation manner of the first aspect, the pilot locking apparatus is configured to obtain modulation depths of one-frequency-multiplication components of N optical pilot signals that are output after the electrical pilot signal is modulated by the optical modulator, where the modulation depths of the one-frequency-multiplication components of the N optical pilot signals correspond one-to-one to initial amplitudes of N electrical pilot signals, and N is an integer greater than 1; and determine the pilot operating point that is currently on the response curve and that is of the optical modulator according to the modulation depths of the one-frequency-multiplication components of the N optical pilot signals, the initial amplitudes of the N electrical pilot signals, and the correspondence between the modulation depth of the one-frequency-multiplication component of the optical pilot signal that is output after the electrical pilot signal is modulated by the optical modulator and the initial amplitude of the electrical pilot signal.

With reference to the first aspect and the foregoing implementation manner of the first aspect, in a second implementation manner of the first aspect, the correspondence between the modulation depth of the one-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

With reference to the first aspect and the foregoing implementation manners of the first aspect, in a third implementation manner of the first aspect, the correspondence between the modulation depth of the two-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

With reference to the first aspect and the foregoing implementation manners of the first aspect, in a fourth implementation manner of the first aspect, the pilot locking apparatus is further configured to adjust the pilot operating point to the target pilot operating point, if the value of the pilot operating point is less than a value of a target pilot operating point, where the value of the target pilot operating point is greater than or equal to the first threshold.

With reference to the first aspect and the foregoing implementation manners of the first aspect, in a fifth implementation manner of the first aspect, the first threshold is a value in a range of 50% to 100%.

With reference to the first aspect and the foregoing implementation manners of the first aspect, in a sixth implementation manner of the first aspect, the target modulation depth is a value in a range of 0.001% to 20%.

With reference to the first aspect and the foregoing implementation manners of the first aspect, in a seventh implementation manner of the first aspect, the value of the target pilot operating point is a value in a range of 80% to 100%.

According to a second aspect, an embodiment provides a pilot locking apparatus, including a first determining unit, configured to determine a pilot operating point that is currently on a response curve and that is of an optical modulator, where the optical modulator is configured to modulate, an electrical service flow signal into which an electrical pilot signal is loaded, onto an optical signal, to generate an optical service flow signal. The pilot locking apparatus may also include a second determining unit configured to determine a target initial amplitude of the electrical pilot signal based on a correspondence between a modulation depth of a one-frequency-multiplication component of an optical pilot signal that is output after the electrical pilot signal is modulated by the optical modulator and an initial amplitude of the electrical pilot signal, and a target modulation depth of the optical pilot signal, if a value of the pilot operating point is less than a first threshold. The pilot locking apparatus may also include a third determining unit configured to determine a target initial amplitude of the electrical pilot signal based on a correspondence between a modulation depth of a two-frequency-multiplication component of the optical pilot signal that is output after the electrical pilot signal is modulated by the optical modulator and the initial amplitude of the electrical pilot signal, and a target modulation depth of the optical pilot signal if a value of the pilot operating point is greater than or equal to a first threshold.

With reference to the second aspect, in a first implementation manner of the second aspect, the first determining unit is configured to obtain modulation depths of one-frequency-multiplication components of N optical pilot signals that are output after the electrical pilot signal is modulated by the optical modulator, where the modulation depths of the one-frequency-multiplication components of the N optical pilot signals correspond one-to-one to initial amplitudes of N electrical pilot signals, and N is an integer greater than 1; and determine the pilot operating point that is currently on the response curve and that is of the optical modulator according to the modulation depths of the one-frequency-multiplication components of the N optical pilot signals, the initial amplitudes of the N electrical pilot signals, and the correspondence between the modulation depth of the one-frequency-multiplication component of the optical pilot signal that is output after the electrical pilot signal is modulated by the optical modulator and the initial amplitude of the electrical pilot signal.

With reference to the second aspect and the foregoing implementation manner of the second aspect, in a second implementation manner of the second aspect, the correspondence between the modulation depth of the one-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

With reference to the second aspect and the foregoing implementation manners of the second aspect, in a third implementation manner of the second aspect, the correspondence between the modulation depth of the two-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

With reference to the second aspect and the foregoing implementation manners of the second aspect, in a fourth implementation manner of the second aspect, the first threshold is a value in a range of 50% to 100%, the target modulation depth is a value in a range of 0.001% to 20%, and the value of the target pilot operating point is a value in a range of 80% to 100%.

According to a third aspect, an embodiment provides a method for controlling a modulation depth of a pilot signal, including: determining a pilot operating point that is currently on a response curve and that is of an optical modulator, where the optical modulator is configured to modulate, an electrical service flow signal into which an electrical pilot signal is loaded, onto an optical signal, to generate an optical service flow signal; if a value of the pilot operating point is less than a first threshold, determining a target initial amplitude of the electrical pilot signal based on a correspondence between a modulation depth of a one-frequency-multiplication component of an optical pilot signal that is output after the electrical pilot signal is modulated by the optical modulator and an initial amplitude of the electrical pilot signal, and a target modulation depth of the optical pilot signal; or if a value of the pilot operating point is greater than or equal to a first threshold, determining a target initial amplitude of the electrical pilot signal based on a correspondence between a modulation depth of a two-frequency-multiplication component of an optical pilot signal that is output after the electrical pilot signal is modulated by the optical modulator and an initial amplitude of the electrical pilot signal, and a target modulation depth of the optical pilot signal; and adjusting the initial amplitude of the electrical pilot signal to the target initial amplitude.

With reference to the third aspect, in a first implementation manner of the third aspect, when the pilot operating point that is currently on the response curve and that is of the optical modulator is determined, the method includes: obtaining modulation depths of one-frequency-multiplication components of N optical pilot signals that are output after the electrical pilot signal is modulated by the optical modulator, where the modulation depths of the one-frequency-multiplication components of the N optical pilot signals correspond one-to-one to initial amplitudes of N electrical pilot signals, and N is an integer greater than 1; and determining the pilot operating point that is currently on the response curve and that is of the optical modulator according to the modulation depths of the one-frequency-multiplication components of the N optical pilot signals, the initial amplitudes of the N electrical pilot signals, and the correspondence between the modulation depth of the one-frequency-multiplication component of the optical pilot signal that is output after the electrical pilot signal is modulated by the optical modulator and the initial amplitude of the electrical pilot signal.

With reference to the third aspect and the foregoing implementation manner of the third aspect, in a second implementation manner of the third aspect, the correspondence between the modulation depth of the one-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

With reference to the third aspect and the foregoing implementation manners of the third aspect, in a third implementation manner of the third aspect, the correspondence between the modulation depth of the two-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

With reference to the third aspect and the foregoing implementation manners of the third aspect, in a fourth implementation manner of the third aspect, after the determining a pilot operating point that is currently on a response curve and that is of an optical modulator, the method further includes: if the value of the pilot operating point is less than a value of a target pilot operating point, adjusting the pilot operating point to the target pilot operating point, where the value of the target pilot operating point is greater than or equal to the first threshold.

With reference to the third aspect and the foregoing implementation manners of the third aspect, in a fifth implementation manner of the third aspect, the first threshold is a value in a range of 50% to 100%, the target modulation depth is a value in a range of 0.001% to 20%, and the value of the target pilot operating point is a value in a range of 80% to 100%.

Based on the foregoing technical solutions, in the embodiments, a dominant component, that is, a one-frequency-multiplication component or a two-frequency-multiplication component, of a pilot signal in this modulation process is determined according to a pilot operating point of an optical modulator. Subsequently, a target initial amplitude of the pilot signal that is needed to obtain a target modulation depth is determined according to a relationship between a modulation depth of the dominant component and an initial amplitude of a pilot, and an initial amplitude of the pilot signal is adjusted to the target initial amplitude. In this way, the pilot modulation depth may be quickly and effectively adjusted, and then the pilot can be locked at an expected modulation depth, thereby ensuring accuracy of detecting a status of an optical channel.

BRIEF DESCRIPTION OF THE DRAWINGS

To describe the technical solutions in the embodiments more clearly, the following briefly introduces the accompanying drawings required for describing the embodiments. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope of the present disclosure.

Figure 1:
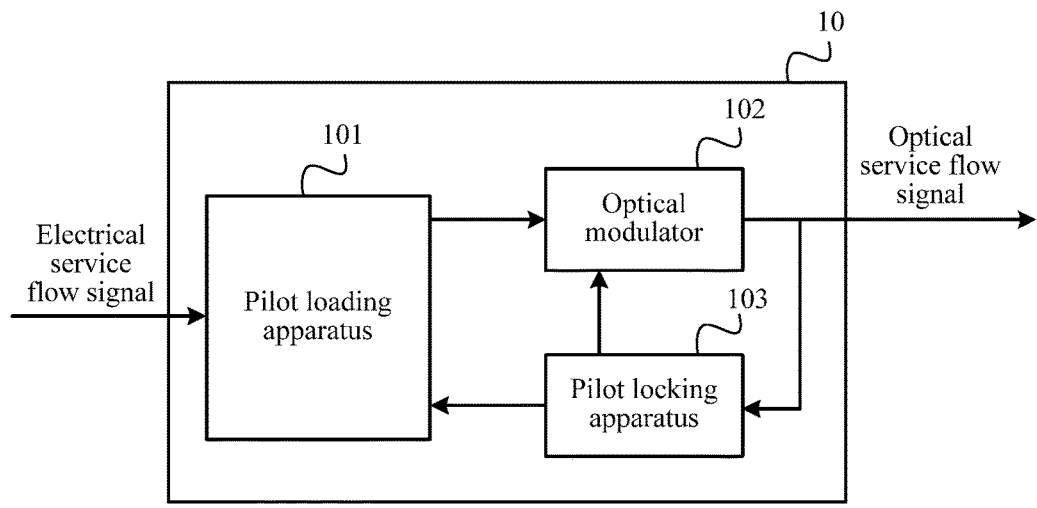
FIG. 1 is a schematic block diagram of a transmitter according to an embodiment.

FIG. 1 is a schematic block diagram of a transmitter according to an embodiment. As shown in FIG. 1, the transmitter 10 includes a pilot loading apparatus 101, an optical modulator 102, and a pilot locking apparatus 103.

The pilot loading apparatus 101 is configured to generate an electrical pilot signal, and load the electrical pilot signal into an electrical service flow signal.

For example, the pilot loading apparatus generates an electrical pilot signal, and then loads the electrical pilot signal into an electrical service flow signal that is input. Specifically, the pilot loading apparatus may include a pilot generation apparatus, a digital signal processor, and a data driver. In this case, the electrical service flow signal is processed by the digital signal processor, and then is input into the data driver. An electrical pilot signal generated by the pilot generation apparatus is loaded, at a pin of the data driver, into the electrical service flow signal, to implement loading of the electrical pilot signal. The pilot generation apparatus can generate electrical pilot signals with different amplitudes according to needs.

It should be understood that, the foregoing description is only a specific example for implementing the pilot loading apparatus, and is intended to help a person skilled in the art better understand this embodiment, but not intended to limit the scope of this embodiment. For example, the pilot loading apparatus may also include only a digital signal processor and a pilot generation apparatus, or may further include another device, such as a digital-to-analog converter. All these variant examples should fall within the protection scope of the present disclosure.

The optical modulator 102 is configured to modulate, the electrical service flow signal into which the electrical pilot signal is loaded, onto an optical signal, to generate an optical service flow signal.

For example, the optical modulator is an MZ modulator or another optical modulator that has a non-linear transfer feature, and is configured to perform optical modulation on a signal that is input, and then a form of a signal that is suitable to be transmitted on an optical channel may be obtained. Herein, the optical modulator modulates, the electrical service flow signal into which the electrical pilot signal is loaded, onto an optical signal, to generate an optical service flow signal.

The pilot locking apparatus 103 is configured to determine a target initial amplitude of the electrical pilot signal and a pilot operating point that is currently on a response curve and that is of the optical modulator, and control the pilot loading apparatus to adjust an initial amplitude of the electrical pilot signal to the target initial amplitude, where if a value of the pilot operating point is less than a first threshold, the target initial amplitude of the electrical pilot signal is determined based on a correspondence between a modulation depth of a one-frequency-multiplication component of an optical pilot signal that is output after the electrical pilot signal is modulated by the optical modulator and the initial amplitude of the electrical pilot signal, and a target modulation depth of the optical pilot signal; or if a value of the pilot operating point is greater than or equal to a first threshold, the target initial amplitude of the electrical pilot signal is determined based on a correspondence between a modulation depth of a two-frequency-multiplication component of an optical pilot signal that is output after the electrical pilot signal is modulated by the optical modulator and the initial amplitude of the electrical pilot signal, and a target modulation depth of the optical pilot signal.

Figure 2:
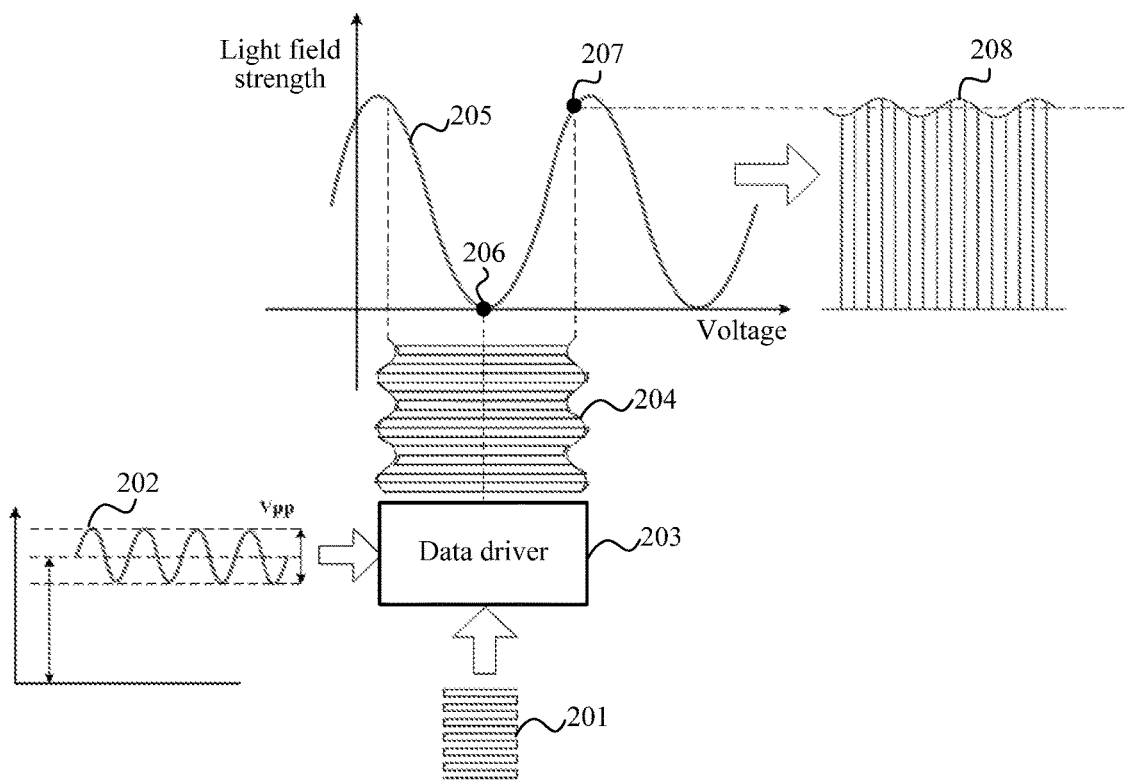
FIG. 2 is a schematic diagram of a pilot operating point according to an embodiment.

It should be understood that, the pilot operating point that is currently on the response curve and that is of the optical modulator is for a modulated object as a whole. FIG. 2 is a schematic diagram of a pilot operating point according to an embodiment. As shown in FIG. 2, an electrical pilot signal 202 whose initial amplitude is $V_{PP}$ and an electrical service flow signal 201 that is output by a digital signal processor are shaped and amplified in a data driver 203, and combined into a whole electrical signal 204. After the electrical signal 204 is modulated by an optical modulator onto an optical signal, an optical service flow signal 208 is obtained.

In this case, the electrical signal 204 is a modulated object. A point that is on a response curve 205 of the optical modulator and to which an amplitude of the electrical signal 204 corresponds is a pilot operating point 207 that is currently on the response curve and that is of the optical modulator. A point 206 on the response curve 205 is a current bias point of the optical modulator.

It should also be understood that, the value of the pilot operating point refers to a ratio of a light field strength corresponding to the pilot operating point to a light field strength corresponding to a vertex of the response curve.

It should also be understood that, the modulation depth refers to a ratio of an amplitude of a signal to power of the signal. The modulation depth of the one-frequency-multiplication component refers to a ratio of the amplitude of the one-frequency-multiplication component of the optical pilot signal to power of the optical pilot signal, and the modulation depth of the two-frequency-multiplication component refers to a ratio of the amplitude of the two-frequency-multiplication component of the optical pilot signal to the power of the optical pilot signal. The amplitude of the pilot signal corresponds to the power of the service flow signal in real time. Therefore, when a pilot is locked at an expected modulation depth, the amplitude of the pilot signal can correspond to the power of the service flow signal in real time, and then a status of an optical channel may be learned by detecting the pilot signal.

The first threshold is an empirical value determined according to a response feature of the optical modulator. If the pilot operating point is less than the first threshold, it indicates that the optical modulator currently operates in a linear operating area. In this case, the one-frequency-multiplication component of the pilot signal plays a dominant role in this modulation process. Therefore, the target initial amplitude of the pilot signal that is needed to obtain the target modulation depth may be determined according to a correspondence between the modulation depth of the one-frequency-multiplication component of the pilot signal and the initial amplitude of the pilot signal.

If the pilot operating point is greater than or equal to the first threshold, it indicates that the optical modulator currently operates in a non-linear operating area. In this case, the two-frequency-multiplication component of the pilot signal plays a dominant role in this modulation process. Therefore, the target initial amplitude of the pilot signal that is needed to obtain the target modulation depth may be determined according to a correspondence between the modulation depth of the two-frequency-multiplication component of the pilot signal and the initial amplitude of the pilot signal.

Based on the foregoing technical solution, in this embodiment, a dominant component, that is, a one-frequency-multiplication component or a two-frequency-multiplication component, of a pilot signal in this modulation process is determined according to a pilot operating point of an optical modulator. Subsequently, a target initial amplitude of the pilot signal that is needed to obtain a target modulation depth is determined according to a relationship between a modulation depth of the dominant component and an initial amplitude of a pilot, and an initial amplitude of the pilot signal is adjusted to the target initial amplitude. In this way, the pilot modulation depth may be quickly and effectively adjusted, and then the pilot can be locked at an expected modulation depth, thereby ensuring accuracy of detecting a status of an optical channel.

In addition, due to a non-linear feature of the optical modulator, after non-linear transfer by the optical modulator, a relationship between power of a pilot signal and an amplitude of the pilot signal is unstable and unpredictable, that is, the pilot is unlocked. Consequently, the status of the optical channel cannot be learned by detecting the pilot signal. According to the method in this embodiment, the pilot can be quickly and effectively locked at the expected modulation depth, and then the accuracy of detecting the status of the optical channel can be ensured.

Optionally, in an embodiment, the correspondence between the modulation depth of the one-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

For example, a description is provided by using an example in which an optical modulator is an MZ modulator of a QPSK code type. When a correspondence between a modulation depth of a one-frequency-multiplication component and an initial amplitude of an electrical pilot signal is determined according to a transfer function of the optical modulator, the following steps may be performed.

After a pilot signal $R(t)=\xi\Box\cos(2\pi f_s t)$ is loaded into a service flow signal $D_{in}(t)$, a data driver outputs an electrical signal $D_{out}(t)$, as shown in a formula (1):

$$D_{out}(t)=D_{in}(t)\Box[1+\xi\Box\cos(2\pi f_s t)] \qquad (1)$$

where $\xi$ is an amplitude of the pilot signal $R(t)$, $f_s$ is a frequency of the pilot signal, and t is a time variable.

The electrical signal $D_{out}(t)$ is modulated by the MZ modulator. The transfer function of the MZ modulator of the QPSK (Quadrature Phase Shift Keying) code type is shown in a formula (2):

$$P_{out}(t) = \frac{P_{in}(t)}{2}\left[1 - \cos\left(\frac{\pi}{2V_\pi}V_{RF\_in}(t)\right)\right] \qquad (2)$$

where $V_{RF\_in}(t)=\eta V_\pi \Box D_{out}(t)$, $\eta$ is a pilot operating point of the MZ modulator, $P_{in}(t)$ is signal power that is input into the MZ modulator, and $P_{out}(t)$ is signal power that is output by the MZ modulator, and $V_\pi$ is a half-wave voltage.

An expression of optical power of a signal, which is output by the MZ modulator, of the QPSK code type can be determined according to the formula (2), as shown in a formula (3):

$$P_{QPSK\_out}(t) = \frac{P_{in}(t)}{2}\Box\{1 - \cos[\pi\Box\eta(1 + \xi\Box\cos(2\pi f_s t))D_{out}(t)]\} \qquad (3)$$

where $f_s$ is the pilot frequency.

The pilot locking apparatus detects an optical signal that is output by the MZ modulator, and may obtain information such as an amplitude and power of the pilot signal after the pilot signal is modulated by the MZ modulator, and then accordingly determine a modulation depth of the pilot signal. Specifically, when detecting the optical signal, the pilot locking apparatus first performs optical-to-electrical conversion and analog-to-digital conversion on the optical signal, then divides the signal into two paths of signals by using time-frequency conversion, where one path of signal obtains a direct current component $P_{DC}$, and the other path of signal obtains an amplitude $P_{1f}$ of the one-frequency-multiplication component and an amplitude $P_{2f}$ of the two-frequency-multiplication component, and accordingly separately determines the modulation depth of the one-frequency-multiplication component and a modulation depth of the two-frequency-multiplication component of the pilot signal.

In addition, amplitude and power information of a pilot signal that is output in an ideal status by the MZ modulator may be determined according to the formula (3). Specifically, after Bessel expansion is performed on cosine items in the formula (3), 0-order, 1-order, and 2-order Bessel functions can be obtained, and respectively correspond to a direct current component $P_{DC}(t)$, an amplitude $P_{1f}(t)$ of the one-frequency-multiplication component, and an amplitude $P_{2f}(t)$ of the two-frequency-multiplication component of the pilot signal at a detection end, which are respectively shown in formulas (4), (5), and (6):

$$P_{DC}(t)=(P_{in}(t)/2)\Box[1-J_0(\eta\xi\pi)\cos(\eta\pi)] \qquad (4)$$

$$P_{1f}(t)=J_1(\eta\xi\pi)\sin(\eta\pi)P_{in}(t)\Box\cos(2\pi f_s t) \qquad (5)$$

$$P_{2f}(t)=J_2(\eta\xi\pi)\cos(\eta\pi)P_{in}(t)\Box\cos(4\pi f_s t) \qquad (6)$$

where $J_0$ is the 0-order Bessel function, $J_1$ is the 1-order Bessel function, and $J_2$ is the 2-order Bessel function.

As described above, the modulation depth refers to a ratio of an amplitude of a signal to power of the signal. The direct current component of the pilot signal corresponds to power of the pilot signal. Therefore, a modulation depth $m_{1f}$ of the one-frequency-multiplication component of the pilot signal can be determined according to the formulas (4), (5), and (6), as shown in a formula (7):

$$m_{1f}=P_{1f}(t)/P_{DC}(t)=2J_1(\eta\xi\pi)\sin(\eta\pi)/[1-J_0(\eta\xi\pi)\cos(\eta\pi)] \qquad (7)$$

Figure 3:
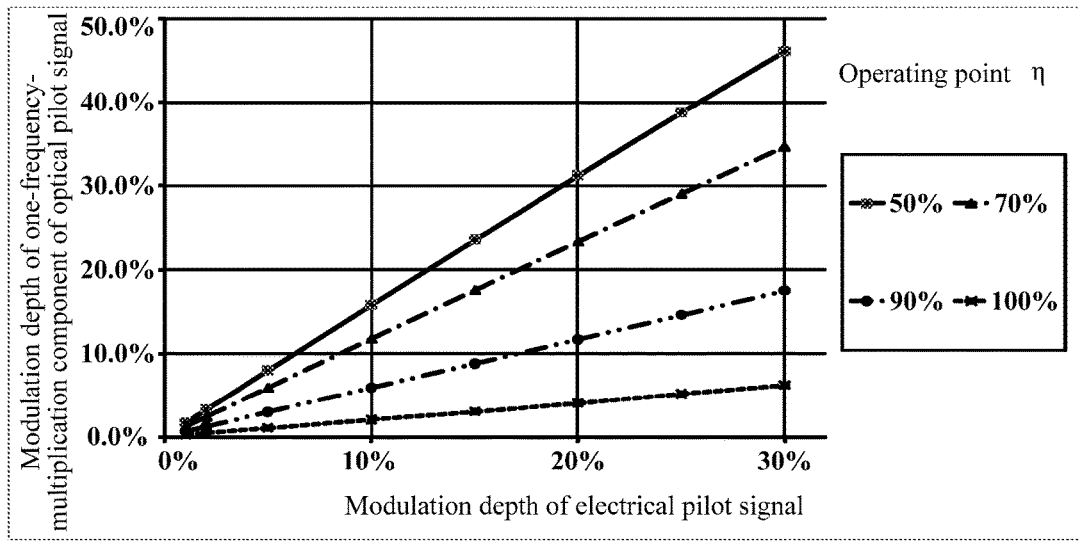
FIG. 3 is a schematic diagram of an emulation result of an optical modulator according to an embodiment.

For another example, FIG. 3 is a schematic diagram of an emulation result of an optical modulator according to an embodiment. In the emulation result shown in FIG. 3, a vertical coordinate indicates a modulation depth of a one-frequency-multiplication component of an optical pilot signal, a horizontal coordinate indicates an initial amplitude of an electrical pilot signal, and four straight lines whose slopes are different respectively correspond to four different operating points. Herein, a modulation depth of the electrical pilot signal is equal to a ratio of the initial amplitude of the electrical pilot signal to a power constant of the electrical pilot signal. Therefore, a correspondence between the modulation depth of the one-frequency-multiplication component of the optical pilot signal and the initial amplitude of the electrical pilot signal may be determined according to the emulation result shown in FIG. 3, and the relationship is a linear relationship. It should be understood that, an individual difference exists between different optical modulators, and slopes of straight lines corresponding to different operating points may be different. The emulation result shown in FIG. 3 is only an example, and the protection scope of this embodiment of the present disclosure is not limited thereto.

Optionally, in another embodiment, the correspondence between the modulation depth of the two-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

For example, similarly, a description is provided by using an example in which an optical modulator is an MZ modulator of a QPSK code type. When a correspondence between a modulation depth of a two-frequency-multiplication component and an initial amplitude of an electrical pilot signal is determined according to a transfer function of the optical modulator, refer to the foregoing steps. Specifically, a modulation depth $m_{2f}$ of the two-frequency-multiplication component is shown in a formula (8):

$$m_{2f}=P_{2f}(t)/P_{DC}(t)=2J_2(\eta\xi\pi)\cos(\eta\pi)/[1-J_0(\eta\xi\pi)\cos(\eta\pi)] \qquad (8)$$

Figure 4:
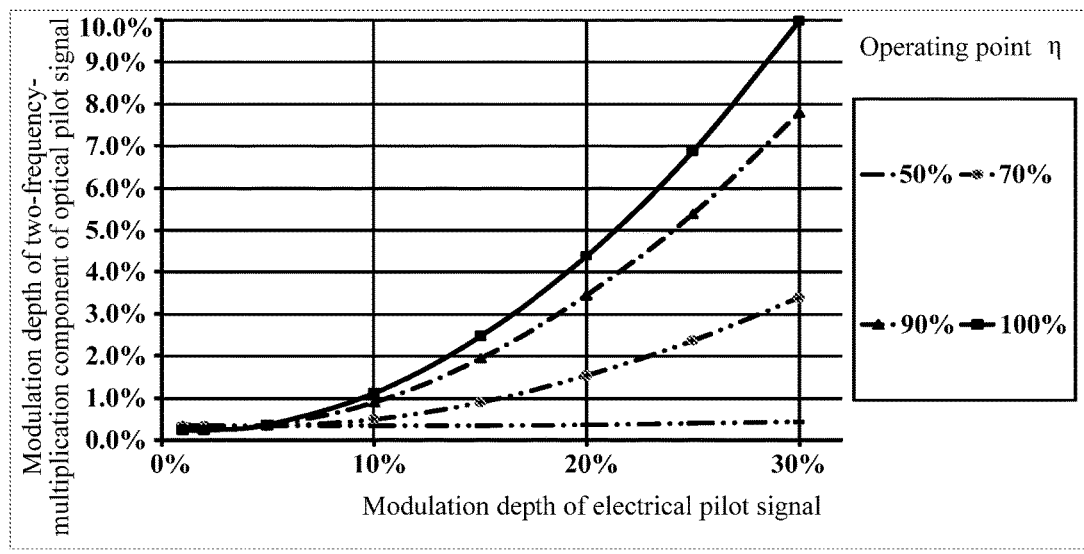
FIG. 4 is a schematic diagram of an emulation result of an optical modulator according to another embodiment.

For another example, FIG. 4 is a schematic diagram of an emulation result of an optical modulator according to another embodiment. In the emulation result shown in FIG. 4, a vertical coordinate indicates a modulation depth of a two-frequency-multiplication component of an optical pilot signal, a horizontal coordinate indicates a modulation depth of an electrical pilot signal, and four different curves respectively correspond to four different operating points. Herein, a modulation depth of the electrical pilot signal is equal to a ratio of the initial amplitude of the electrical pilot signal to a power constant of the electrical pilot signal. Therefore, a correspondence between the modulation depth of the twofrequency-multiplication component of the optical pilot signal and the initial amplitude of the electrical pilot signal may be determined according to the emulation result shown in FIG. 4, and the relationship is a non-linear relationship. It should be understood that, an individual difference exists between different optical modulators. The emulation result shown in FIG. 4 is only an example, and the protection scope of this embodiment is not limited thereto.

Optionally, in an embodiment, the pilot locking apparatus 103 is configured to obtain modulation depths of one-frequency-multiplication components of N optical pilot signals that are output after the electrical pilot signal is modulated by the optical modulator, where the modulation depths of the one-frequency-multiplication components of the N optical pilot signals correspond one-to-one to initial amplitudes of N electrical pilot signals, and N is an integer greater than 1.

Then, a pilot operating point that is currently on a response curve and that is of the optical modulator is determined according to the modulation depths of the one-frequency-multiplication components of the N optical pilot signals, the initial amplitudes of the N electrical pilot signals, and the correspondence between the modulation depth of the one-frequency-multiplication component of the optical pilot signal that is output after the electrical pilot signal is modulated by the optical modulator and the initial amplitude of the electrical pilot signal.

For example, a correspondence between a modulation depth of a one-frequency-multiplication component and an initial amplitude of an electrical pilot signal is a linear relationship, and correspondences between modulation depths of one-frequency-multiplication components of different pilot operating points and the initial amplitude of the electrical pilot signal are linear relationships, which correspond to different slopes.

When a value of N is 2, initial amplitudes of two electrical pilot signals are separately applied, to obtain modulation depths (which may be considered as two points) of corresponding two one-frequency-multiplication components, and a slope of a straight line formed by the two points is compared with the foregoing slopes for the different operating points. A pilot operating point corresponding to a same or similar slope is the pilot operating point that is currently on the response curve and that is of the optical modulator. Alternatively, as shown in FIG. 3, the applied initial amplitudes of the two electrical pilot signals are divided by a power constant, to obtain modulation depths of the two electrical pilot signals. The modulation depths of the two electrical pilot signals and the modulation depths of the corresponding two one-frequency-multiplication components form two points, a slope of a straight line formed by the two points is determined, then the obtained slope value is separately compared with the slope values of the straight lines corresponding to the different operating points in FIG. 3, and then a current pilot operating point is determined.

When the value of N is greater than 2, slopes between the N points may be determined, and one of or an average value of the slope values is compared with the foregoing slopes for the different operating points. A pilot operating point corresponding to a same or similar slope is the pilot operating point that is currently on the response curve and that is of the optical modulator.

For example, a pilot generation apparatus applies a pilot signal whose initial amplitude is $\xi_1$ to a data driver, and a pilot locking apparatus detects an optical signal to obtain a modulation depth $m_{1f}^1$ of a one-frequency-multiplication component. Then, the pilot generation apparatus applies a pilot signal whose initial amplitude is $\xi_2$ to the data driver, and the pilot locking apparatus detects the optical signal to obtain a modulation depth $m_{1f}^2$ of the one-frequency-multiplication component. Then, $k=(m_{1f}^1-m_{1f}^2)/(\xi_1-\xi_2)$ is compared with the relationship (a corresponding slope $k_0$) that is obtained in the foregoing and that is between modulation depths of one-frequency-multiplication components for different pilot operating points and the electrical pilot signal, so that the pilot operating point that is currently on the response curve and that is of the MZ modulator may be determined.

After a pilot operating point η of the MZ modulator is learned, a correspondence between the modulation depth of the one-frequency-multiplication component of the pilot signal and the initial amplitude of the pilot signal may be determined according to the formula (7). Similarly, a correspondence between the modulation depth of the two-frequency-multiplication component of the pilot signal and the initial amplitude of the pilot signal may be determined according to the formula (8).

It can be seen that, the modulation depth ($m_{1f}$ or $m_{2f}$) of the pilot signal is determined jointly by the initial amplitude $\xi$ of the pilot signal and the pilot operating point η of the MZ modulator. As shown in the formula (7), when the pilot operating point of the MZ modulator is 100%, a value of a sine function in the modulation depth $m_{1f}$ of the one-frequency-multiplication component is 0, that is, there is no one-frequency-multiplication component. As shown in the formula (8), when the pilot operating point of the MZ modulator is 50%, a value of a cosine function in the modulation depth $m_{2f}$ of the two-frequency-multiplication component is 0, that is, there is no two-frequency-multiplication component.

It can be seen from this that, the foregoing correspondence may be briefly described as: when the pilot operating point of the MZ modulator is in a linear area of the response curve of the MZ modulator, the one-frequency-multiplication component is dominant; or when the pilot operating point of the MZ modulator is in an inflection point area (non-linear area) of the response curve of the MZ modulator, the two-frequency-multiplication component is dominant. Herein, 50% to 90% may be defined as the linear area in which the dominant one-frequency-multiplication component is used, and 90% to 100% is defined as the inflection point area (non-linear area) in which the dominant two-frequency-multiplication component is used. Herein, the first threshold is 90%.

For another example, when the first threshold is 80%, accordingly 50% to 80% is the linear area, and 80% to 100% is the inflection point area (non-linear area). It should be understood that, for a different optical modulator, the linear area and the non-linear area are defined differently, and a value of the corresponding first threshold is also different, which should all fall within the protection scope of this embodiment.

Alternatively, the MZ modulator may be tested or emulated. In a case in which the pilot operating point is fixed, a dependency between the modulation depth $m_{1f}$ of the one-frequency-multiplication component and the initial amplitude $\xi$ of the pilot, and a dependency between the modulation depth $m_{2f}$ of the two-frequency-multiplication component and the initial amplitude $\xi$ of the pilot are determined.

The modulation depth $m_{1f}$ of the one-frequency-multiplication varies linearly with the initial amplitude $\xi$, and therefore when the pilot operating point that is currently on the response curve and that is of the MZ modulator is determined, different initial amplitudes $\xi$ may be separately applied, to obtain modulation depths $m_{1f}$ of corresponding one-frequency-multiplication components. Then, the pilot operating point that is currently on the response curve and that is of the MZ modulator is accordingly determined. Specifically, the optical signal may be detected according to the method described above, and then the modulation depths of the one-frequency-multiplication components are determined according to a detection result. To avoid repetition, details are not described herein again.

Then, the pilot operating point of the MZ modulator is compared with the first threshold, that is, whether the pilot operating point falls within the linear area or the non-linear area is determined, and then the dominant component for the pilot operating point is determined. If the pilot operating point is less than the first threshold (the pilot operating point falls within the linear area), the one-frequency-multiplication component is dominant, and a role of the two-frequency-multiplication component is relatively small, and may be omitted. A corresponding initial amplitude is determined based on the correspondence between the modulation depth of the one-frequency-multiplication component and the initial amplitude of the pilot signal, and an expected target modulation depth (for example, 0.001% to 20%). In other words, the target modulation depth is substituted into the correspondence, to determine the corresponding initial amplitude.

If the pilot operating point is greater than or equal to the first threshold (the pilot operating point falls within the non-linear area), the two-frequency-multiplication component is dominant, and a role of the one-frequency-multiplication component is relatively small, and may be omitted. A corresponding initial amplitude is determined based on the correspondence between the modulation depth of the two-frequency-multiplication component and the initial amplitude of the pilot signal, and an expected target modulation depth (for example, 0.001% to 20%).

Finally, the pilot loading apparatus may generate an appropriate pilot signal according to a result (for example, a target initial amplitude of the pilot signal) that is output by the pilot locking apparatus, and finally lock the modulation depth of the pilot signal at the expected modulation depth (for example, 2%).

Optionally, in another embodiment, the pilot locking apparatus is further configured to: if the value of the pilot operating point is less than a value of a target pilot operating point, adjust the pilot operating point to the target pilot operating point, where the value of the target pilot operating point is greater than or equal to the first threshold.

For example, after the current pilot operating point of the MZ modulator is determined, if the pilot operating point is not ideal, the pilot operating point may be adjusted to the target pilot operating point. For example, when the MZ modulator performs QPSK modulation, a bias point is at a zero point, full-scale modulation makes eye opening the maximum, and in this case, the target pilot operating point is required to be greater than 90%. Specifically, a gain of an electrical signal that is output by the data driver may be changed, to adjust the pilot operating point of the MZ modulator.

Specifically, the gain of the electrical signal that is output by the data driver may be changed, to adjust the pilot operating point of the MZ modulator. Specifically, a pilot signal whose initial amplitude is $\xi_1$ may be applied, to accordingly obtain a modulation depth $m_{1f}^1$ of the one-frequency-multiplication component. Then, a pilot signal whose initial amplitude is $\xi_2$ is applied, to accordingly obtain a modulation depth $m_{1f}^2$ of the one-frequency-multiplication component. Then, $k=(m_{1f}^1-m_{1f}^2)/(\xi_1-\xi_2)$ is compared with a relationship (a corresponding slope $k_0$) between the modulation depth of the one-frequency-multiplication component for the target pilot operating point and the pilot signal. If $k > k_0$, the data driver is controlled to increase the gain of the electrical signal, and k is determined again based on this, until $k \le k_0$.

Optionally, in another embodiment, the first threshold is a value in a range of 50% to 100%.

Optionally, in another embodiment, the target modulation depth is a value in a range of 0.001% to 20%.

Optionally, in another embodiment, the value of the target pilot operating point is a value in a range of 80% to 100%.

Figure 5:
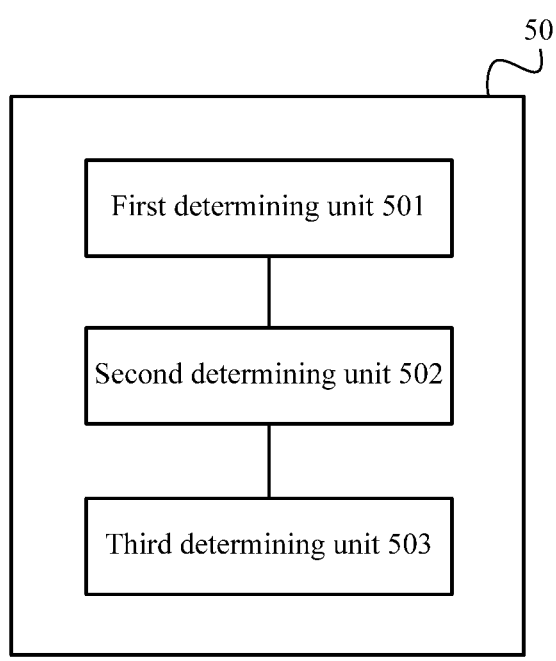
FIG. 5 is a schematic block diagram of a pilot locking apparatus according to an embodiment.

FIG. 5 is a schematic block diagram of a pilot locking apparatus according to an embodiment. For example, the pilot locking apparatus 50 includes a first determining unit 501, a second determining unit 502, and a third determining unit 503.

The first determining unit 501 is configured to determine a pilot operating point that is currently on a response curve and that is of an optical modulator, where the optical modulator is configured to modulate, an electrical service flow signal into which an electrical pilot signal is loaded, onto an optical signal, to generate an optical service flow signal.

For example, the optical modulator is an MZ modulator or another optical modulator that has a non-linear transfer feature, and is configured to perform optical modulation on a signal that is input, and then a form of a signal that is suitable to be transmitted on an optical channel may be obtained. Herein, the optical modulator modulates, the electrical service flow signal into which the electrical pilot signal is loaded, onto an optical signal, to generate an optical service flow signal.

The second determining unit 502 is configured to: if a value of the pilot operating point is less than a first threshold, determine a target initial amplitude of the electrical pilot signal based on a correspondence between a modulation depth of a one-frequency-multiplication component of an optical pilot signal that is output after the electrical pilot signal is modulated by the optical modulator and an initial amplitude of the electrical pilot signal, and a target modulation depth of the optical pilot signal.

For example, the first threshold is an empirical value determined according to a response feature of the optical modulator. If the operating point is less than the first threshold, it indicates that the optical modulator currently operates in a linear operating area. In this case, the one-frequency-multiplication component of the pilot signal plays a dominant role in this modulation process. Therefore, the target initial amplitude of the pilot signal that is needed to obtain the target modulation depth may be determined according to a correspondence between the modulation depth of the one-frequency-multiplication component of the pilot signal and the initial amplitude of the pilot signal.

The third determining unit 503 is configured to: if a value of the pilot operating point is greater than or equal to a first threshold, determine a target initial amplitude of the electrical pilot signal based on a correspondence between a modulation depth of a two-frequency-multiplication component of the optical pilot signal that is output after the electrical pilot signal is modulated by the optical modulator and the initial amplitude of the electrical pilot signal, and a target modulation depth of the optical pilot signal.

For example, the first threshold is an empirical value determined according to a response feature of the optical modulator. If the operating point is greater than or equal to the first threshold, it indicates that the optical modulator currently operates in a non-linear operating area. In this case, the two-frequency-multiplication component of the pilot signal plays a dominant role in this modulation process. Therefore, the target initial amplitude of the pilot signal that is needed to obtain the target modulation depth may be determined according to a correspondence between the modulation depth of the two-frequency-multiplication component of the pilot signal and the initial amplitude of the pilot signal.

Based on the foregoing technical solution, in this embodiment, a dominant component, that is, a one-frequency-multiplication component or a two-frequency-multiplication component, of a pilot signal in this modulation process is determined according to a pilot operating point of an optical modulator. Subsequently, a target initial amplitude of the pilot signal that is needed to obtain a target modulation depth is determined according to a relationship between a modulation depth of the dominant component and an initial amplitude of a pilot, and therefore an initial amplitude of the pilot signal may be adjusted to the target initial amplitude. In this way, the pilot modulation depth may be quickly and effectively adjusted, and then the pilot can be locked at an expected modulation depth, thereby ensuring accuracy of detecting a status of an optical channel.

In addition, due to a non-linear feature of the optical modulator, after non-linear transfer by the optical modulator, a relationship between power of a pilot signal and an amplitude of the pilot signal is unstable and unpredictable, that is, the pilot is unlocked. Consequently, the status of the optical channel cannot be learned by detecting the pilot signal. According to the method in this embodiment, the pilot can be quickly and effectively locked at the expected modulation depth, and then the accuracy of detecting the status of the optical channel can be ensured.

It should be understood that, the pilot operating point that is currently on the response curve and that is of the optical modulator is for a modulated object as a whole. It should also be understood that, the value of the pilot operating point refers to a ratio of a light field strength corresponding to the pilot operating point to a light field strength corresponding to a vertex of the response curve.

It should also be understood that, the modulation depth refers to a ratio of an amplitude of a signal to power of the signal. The modulation depth of the one-frequency-multiplication component refers to a ratio of the amplitude of the one-frequency-multiplication component of the optical pilot signal to power of the optical pilot signal, and the modulation depth of the two-frequency-multiplication component refers to a ratio of the amplitude of the two-frequency-multiplication component of the optical pilot signal to the power of the optical pilot signal. The amplitude of the pilot signal corresponds to the power of the service flow signal in real time. Therefore, when a pilot is locked at an expected modulation depth, the amplitude of the pilot signal can correspond to the power of the service flow signal in real time, and then a status of an optical channel may be learned by detecting the pilot signal.

The first threshold is an empirical value determined according to a response feature of the optical modulator. If the pilot operating point is less than the first threshold, it indicates that the optical modulator currently operates in a linear operating area. In this case, the one-frequency-multiplication component of the pilot signal plays a dominant role in this modulation process. Therefore, the target initial amplitude of the pilot signal that is needed to obtain the target modulation depth may be determined according to a correspondence between the modulation depth of the one-frequency-multiplication component of the pilot signal and the initial amplitude of the pilot signal.

If the pilot operating point is greater than or equal to the first threshold, it indicates that the optical modulator currently operates in a non-linear operating area. In this case, the two-frequency-multiplication component of the pilot signal plays a dominant role in this modulation process. Therefore, the target initial amplitude of the pilot signal that is needed to obtain the target modulation depth may be determined according to a correspondence between the modulation depth of the two-frequency-multiplication component of the pilot signal and the initial amplitude of the pilot signal.

Optionally, in an embodiment, the first determining unit 501 is configured to obtain modulation depths of one-frequency-multiplication components of N optical pilot signals that are output after the electrical pilot signal is modulated by the optical modulator, where the modulation depths of the one-frequency-multiplication components of the N optical pilot signals correspond one-to-one to initial amplitudes of N electrical pilot signals, and N is an integer greater than 1; and determine the pilot operating point that is currently on the response curve and that is of the optical modulator according to the modulation depths of the one-frequency-multiplication components of the N optical pilot signals, the initial amplitudes of the N electrical pilot signals, and the correspondence between the modulation depth of the one-frequency-multiplication component of the optical pilot signal that is output after the electrical pilot signal is modulated by the optical modulator and the initial amplitude of the electrical pilot signal.

Optionally, in another embodiment, the correspondence between the modulation depth of the one-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

Optionally, in another embodiment, the correspondence between the modulation depth of the two-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

Optionally, in another embodiment, the first threshold is a value in a range of 50% to 100%, the target modulation depth is a value in a range of 0.001% to 20%, and the value of the target pilot operating point is a value in a range of 80% to 100%.

Figure 6:
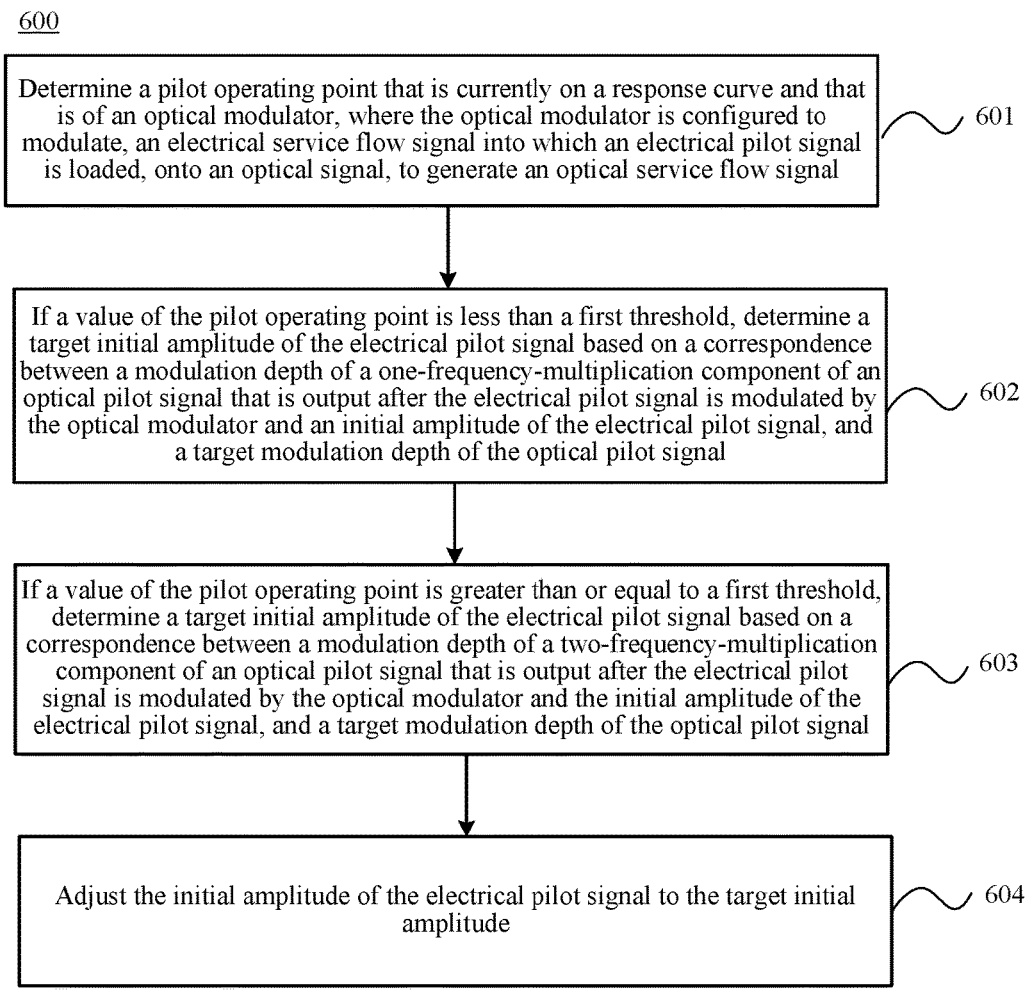
FIG. 6 is a schematic flowchart of a method for controlling a modulation depth of a pilot signal according to an embodiment.

FIG. 6 is a schematic flowchart of a method for controlling a modulation depth of a pilot signal according to an embodiment. The method 600 in FIG. 6 may be performed by a transmitter, for example, a transmitter 10 shown in FIG. 1.

601: Determine a pilot operating point that is currently on a response curve and that is of an optical modulator, where the optical modulator is configured to modulate, an electrical service flow signal into which an electrical pilot signal is loaded, onto an optical signal, to generate an optical service flow signal.

For example, the optical modulator is an MZ modulator or another optical modulator that has a non-linear transfer feature, and is configured to perform optical modulation on a signal that is input, and then a form of a signal that is suitable to be transmitted on an optical channel may be obtained. Herein, the optical modulator modulates, the electrical service flow signal into which the electrical pilot signal is loaded, onto an optical signal, to generate an optical service flow signal.

602: If a value of the pilot operating point is less than a first threshold, determine a target initial amplitude of the electrical pilot signal based on a correspondence between a modulation depth of a one-frequency-multiplication component of an optical pilot signal that is output after the electrical pilot signal is modulated by the optical modulator and an initial amplitude of the electrical pilot signal, and a target modulation depth of the optical pilot signal.

For example, the first threshold is an empirical value determined according to a response feature of the optical modulator. If the operating point is less than the first threshold, it indicates that the optical modulator currently operates in a linear operating area. In this case, the one-frequency-multiplication component of the pilot signal plays a dominant role in this modulation process. Therefore, the target initial amplitude of the pilot signal that is needed to obtain the target modulation depth may be determined according to a correspondence between the modulation depth of the one-frequency-multiplication component of the pilot signal and the initial amplitude of the pilot signal.

603: If a value of the pilot operating point is greater than or equal to a first threshold, determine a target initial amplitude of the electrical pilot signal based on a correspondence between a modulation depth of a two-frequency-multiplication component of an optical pilot signal that is output after the electrical pilot signal is modulated by the optical modulator and the initial amplitude of the electrical pilot signal, and a target modulation depth of the optical pilot signal.

For example, the first threshold is an empirical value determined according to a response feature of the optical modulator. If the operating point is greater than or equal to the first threshold, it indicates that the optical modulator currently operates in a non-linear operating area. In this case, the two-frequency-multiplication component of the pilot signal plays a dominant role in this modulation process. Therefore, the target initial amplitude of the pilot signal that is needed to obtain the target modulation depth may be determined according to a correspondence between the modulation depth of the two-frequency-multiplication component of the pilot signal and the initial amplitude of the pilot signal.

604: Adjust the initial amplitude of the electrical pilot signal to the target initial amplitude.

Based on the foregoing technical solution, in this embodiment, a dominant component, that is, a one-frequency-multiplication component or a two-frequency-multiplication component, of a pilot signal in this modulation process is determined according to a pilot operating point of an optical modulator. Subsequently, a target initial amplitude of the pilot signal that is needed to obtain a target modulation depth is determined according to a relationship between a modulation depth of the dominant component and an initial amplitude of a pilot, and an initial amplitude of the pilot signal is adjusted to the target initial amplitude. In this way, the pilot modulation depth may be quickly and effectively adjusted, and then the pilot can be locked at an expected modulation depth, thereby ensuring accuracy of detecting a status of an optical channel.

In addition, due to a non-linear feature of the optical modulator, after non-linear transfer by the optical modulator, a relationship between power of a pilot signal and an amplitude of the pilot signal is unstable and unpredictable, that is, the pilot is unlocked. Consequently, the status of the optical channel cannot be learned by detecting the pilot signal. According to the method in this embodiment, the pilot can be quickly and effectively locked at the expected modulation depth, and then the accuracy of detecting the status of the optical channel can be ensured.

It should be understood that, the pilot operating point that is currently on the response curve and that is of the optical modulator is for a modulated object as a whole. It should also be understood that, the value of the pilot operating point refers to a ratio of a light field strength corresponding to the pilot operating point to a light field strength corresponding to a vertex of the response curve.

It should also be understood that, the modulation depth refers to a ratio of an amplitude of a signal to power of the signal. The modulation depth of the one-frequency-multiplication component refers to a ratio of the amplitude of the one-frequency-multiplication component of the optical pilot signal to power of the optical pilot signal, and the modulation depth of the two-frequency-multiplication component refers to a ratio of the amplitude of the two-frequency-multiplication component of the optical pilot signal to the power of the optical pilot signal. The amplitude of the pilot signal corresponds to the power of the service flow signal in real time. Therefore, when a pilot is locked at an expected modulation depth, the amplitude of the pilot signal can correspond to the power of the service flow signal in real time, and then a status of an optical channel may be learned by detecting the pilot signal.

The first threshold is an empirical value determined according to a response feature of the optical modulator. If the pilot operating point is less than the first threshold, it indicates that the optical modulator currently operates in a linear operating area. In this case, the one-frequency-multiplication component of the pilot signal plays a dominant role in this modulation process. Therefore, the target initial amplitude of the pilot signal that is needed to obtain the target modulation depth may be determined according to a correspondence between the modulation depth of the one-frequency-multiplication component of the pilot signal and the initial amplitude of the pilot signal.

If the pilot operating point is greater than or equal to the first threshold, it indicates that the optical modulator currently operates in a non-linear operating area. In this case, the two-frequency-multiplication component of the pilot signal plays a dominant role in this modulation process. Therefore, the target initial amplitude of the pilot signal that is needed to obtain the target modulation depth may be determined according to a correspondence between the modulation depth of the two-frequency-multiplication component of the pilot signal and the initial amplitude of the pilot signal.

Optionally, in an embodiment, the correspondence between the modulation depth of the one-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

For example, a description is provided by using an example in which an optical modulator is an MZ modulator of a QPSK code type. When a correspondence between a modulation depth of a one-frequency-multiplication component and an initial amplitude of an electrical pilot signal is determined according to a transfer function of the optical modulator, the following steps may be performed.

After a pilot signal $R(t)=\xi\Box\cos(2\pi f_s t)$ is loaded into a service flow signal $D_{in}(t)$, a data driver outputs an electrical signal $D_{out}(t)$, as shown in a formula (9):

$$D_{out}(t)=D_{in}(t)\Box[1+\xi\Box\cos(2\pi f_s t)] \quad (9)$$

where $\xi$ is an amplitude of the pilot signal $R(t)$, $f_s$ is a frequency of the pilot signal, and t is a time variable.

The electrical signal $D_{out}(t)$ is modulated by the MZ modulator. The transfer function of the MZ modulator of the QPSK (Quadrature Phase Shift Keying) code type is shown in a formula (10):

$$P_{out}(t) = \frac{P_{in}(t)}{2}\left[1 - \cos\left(\frac{\pi}{2V_\pi}V_{RF\_in}(t)\right)\right] \quad (10)$$

where $V_{RF\_in}(t)=\eta V_\pi\Box D_{out}(t)$, $\eta$ is a pilot operating point of the MZ modulator, $P_{in}(t)$ is signal power that is input into the MZ modulator, and $P_{out}(t)$ is signal power that is output by the MZ modulator, and $V_\pi$ is a half-wave voltage.

An expression of optical power of a signal, which is output by the MZ modulator, of the QPSK code type can be determined according to the formula (10), as shown in a formula (11):

$$P_{QPSK\_out}(t) = \frac{P_{in}(t)}{2}\Box\{1 - \cos[\pi\Box\eta(1 + \xi\Box\cos(2\pi f_s t))D_{out}(t)]\} \quad (11)$$

where $f_s$ is the pilot frequency.

The pilot locking apparatus detects an optical signal that is output by the MZ modulator, and may obtain information such as an amplitude and power of the pilot signal after the pilot signal is modulated by the MZ modulator, and then accordingly determine a modulation depth of the pilot signal. Specifically, when detecting the optical signal, the pilot locking apparatus first performs optical-to-electrical conversion and analog-to-digital conversion on the optical signal, then divides the signal into two paths of signals by using time-frequency conversion, where one path of signal obtains a direct current component $P_{DC}$, and the other path of signal obtains an amplitude $P_{1f}$ of the one-frequency-multiplication component and an amplitude $P_{2f}$ of the two-frequency-multiplication component, and accordingly separately determines the modulation depth of the one-frequency-multiplication component and a modulation depth of the two-frequency-multiplication component of the pilot signal.

In addition, amplitude and power information of a pilot signal that is output in an ideal status by the MZ modulator may be determined according to the formula (11). Specifically, after Bessel expansion is performed on cosine items in the formula (11), 0-order, 1-order, and 2-order Bessel functions can be obtained, and respectively correspond to a direct current component $P_{DC}(t)$, an amplitude $P_{1f}(t)$ of the one-frequency-multiplication component, and an amplitude $P_{2f}(t)$ of the two-frequency-multiplication component of the pilot signal at a detection end, which are respectively shown in formulas (12), (13), and (14):

$$P_{DC}(t)=(P_{in}(t)/2)\Box[1-J_0(\eta\xi\pi)\cos(\eta\pi) \quad (12)$$

$$P_{1f}(t)=J_1(\eta\xi\pi)\sin(\eta\pi)P_{in}(t)\Box\cos(2\pi f_s t) \quad (13)$$

$$P_{2f}(t)=J_2(\eta\xi\pi)\cos(\eta\pi)P_{in}(t)\Box\cos(4\pi f_s t) \quad (14)$$

where $J_0$ is the 0-order Bessel function, $J_1$ is the 1-order Bessel function, and $J_2$ is the 2-order Bessel function.

As described above, the modulation depth refers to a ratio of an amplitude of a signal to power of the signal. The direct current component of the pilot signal corresponds to power of the pilot signal. Therefore, a modulation depth $m_{1f}$ of the one-frequency-multiplication component of the pilot signal can be determined according to the formulas (12), (13), and (14), as shown in a formula (15):

$$m_{1f}=P_{1f}(t)/P_{DC}(t)=2J_1(\eta\xi\pi)\sin(\eta\pi)/[1-J_0(\eta\xi\pi)\cos(\eta\pi)] \quad (15)$$

Optionally, in another embodiment, the correspondence between the modulation depth of the two-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

Similarly, a description is provided by using an example in which an optical modulator is an MZ modulator of a QPSK code type. When a correspondence between a modulation depth of a two-frequency-multiplication component and an initial amplitude of an electrical pilot signal is determined according to a transfer function of the optical modulator, refer to the foregoing steps. Specifically, a modulation depth $m_{2f}$ of the two-frequency-multiplication component is shown in a formula (16):

$$m_{2f}=P_{2f}(t)/P_{DC}(t)=2J_2(\eta\xi\pi)\cos(\eta\pi)/[1-J_0(\eta\xi\pi)\cos(\eta\pi)] \quad (16)$$

Optionally, in an embodiment, when the pilot operating point that is currently on the response curve and that is of the optical modulator is determined, modulation depths of one-frequency-multiplication components of N optical pilot signals that are output after the electrical pilot signal is modulated by the optical modulator may be obtained, where the modulation depths of the one-frequency-multiplication components of the N optical pilot signals correspond one-to-one to initial amplitudes of N electrical pilot signals, and N is an integer greater than 1.

Then, the pilot operating point that is currently on the response curve and that is of the optical modulator is determined according to the modulation depths of the one-frequency-multiplication components of the N optical pilot signals, the initial amplitudes of the N electrical pilot signals, and the correspondence between the modulation depth of the one-frequency-multiplication component of the optical pilot signal that is output after the electrical pilot signal is modulated by the optical modulator and the initial amplitude of the electrical pilot signal.

For example, a correspondence between a modulation depth of a one-frequency-multiplication component and an initial amplitude of an electrical pilot signal is a linear relationship, and correspondences between modulation depths of one-frequency-multiplication components of different pilot operating points and the initial amplitude of the electrical pilot signal are linear relationships, which correspond to different slopes.

When a value of N is 2, initial amplitudes of two electrical pilot signals are separately applied, to obtain modulation depths (which may be considered as two points) of corresponding two one-frequency-multiplication components, and a slope of a straight line formed by the two points is compared with the foregoing slopes for the different operating points. A pilot operating point corresponding to a same or similar slope is the pilot operating point that is currently on the response curve and that is of the optical modulator. Alternatively, as shown in FIG. 3, the applied initial amplitudes of the two electrical pilot signals are divided by a power constant, to obtain modulation depths of the two electrical pilot signals. The modulation depths of the two electrical pilot signals and the modulation depths of the corresponding two one-frequency-multiplication components form two points, a slope of a straight line formed by the two points is determined, then the obtained slope value is separately compared with the slope values of the straight lines corresponding to the different operating points in FIG. 3, and then a current pilot operating point is determined.

When the value of N is greater than 2, slopes between the N points may be determined, and one of or an average value of the slope values is compared with the foregoing slopes for the different operating points. A pilot operating point corresponding to a same or similar slope is the pilot operating point that is currently on the response curve and that is of the optical modulator.

For example, a pilot generation apparatus applies a pilot signal whose initial amplitude is $\xi_1$ to a data driver, and a pilot locking apparatus detects an optical signal to obtain a modulation depth $m_{1f}^1$ of a one-frequency-multiplication component. Then, the pilot generation apparatus applies a pilot signal whose initial amplitude is $\xi_2$ to the data driver, and the pilot locking apparatus detects the optical signal to obtain a modulation depth $m_{1f}^2$ of the one-frequency-multiplication component. Then, $k=(m_{1f}^1-m_{1f}^2)/(\xi_1-\xi_2)$ is compared with the relationship (a corresponding slope $k_0$) that is obtained in the foregoing and that is between modulation depths of one-frequency-multiplication components for different pilot operating points and the electrical pilot signal, so that the pilot operating point that is currently on the response curve and that is of the MZ modulator may be determined.

After a pilot operating point η of the MZ modulator is learned, a correspondence between the modulation depth of the one-frequency-multiplication component of the pilot signal and the initial amplitude of the pilot signal may be determined according to the formula (7). Similarly, a correspondence between the modulation depth of the two-frequency-multiplication component of the pilot signal and the initial amplitude of the pilot signal may be determined according to the formula (8).

It can be seen that, the modulation depth ($m_{1f}$ or $m_{2f}$) of the pilot signal is determined jointly by the initial amplitude $\xi$ of the pilot signal and the pilot operating point η of the MZ modulator. As shown in the formula (7), when the pilot operating point of the MZ modulator is 100%, a value of a sine function in the modulation depth $m_{1f}$ of the one-frequency-multiplication component is 0, that is, there is no one-frequency-multiplication component. As shown in the formula (8), when the pilot operating point of the MZ modulator is 50%, a value of a cosine function in the modulation depth $m_{2f}$ of the two-frequency-multiplication component is 0, that is, there is no two-frequency-multiplication component.

It can be seen from this that, the foregoing correspondence may be briefly described as: when the pilot operating point of the MZ modulator is in a linear area of the response curve of the MZ modulator, the one-frequency-multiplication component is dominant; or when the pilot operating point of the MZ modulator is in an inflection point area (non-linear area) of the response curve of the MZ modulator, the two-frequency-multiplication component is dominant. Herein, 50% to 90% may be defined as the linear area in which the dominant one-frequency-multiplication component is used, and 90% to 100% is defined as the inflection point area (non-linear area) in which the dominant two-frequency-multiplication component is used. Herein, the first threshold is 90%.

For another example, when the first threshold is 80%, accordingly 50% to 80% is the linear area, and 80% to 100% is the inflection point area (non-linear area). It should be understood that, for a different optical modulator, the linear area and the non-linear area are defined differently, and a value of the corresponding first threshold is also different, which should all fall within the protection scope of this embodiment.

Alternatively, the MZ modulator may be tested or emulated. In a case in which the pilot operating point is fixed, a dependency between the modulation depth $m_{1f}$ of the one-frequency-multiplication component and the initial amplitude $\xi$ of the pilot, and a dependency between the modulation depth $m_{2f}$ of the two-frequency-multiplication component and the initial amplitude $\xi$ of the pilot are determined.

The modulation depth $m_{1f}$ of the one-frequency-multiplication varies linearly with the initial amplitude $\xi$, and therefore when the pilot operating point that is currently on the response curve and that is of the MZ modulator is determined, different initial amplitudes $\xi$ may be separately applied, to obtain modulation depths $m_{1f}$ of corresponding one-frequency-multiplication components. Then, the pilot operating point that is currently on the response curve and that is of the MZ modulator is accordingly determined. Specifically, the optical signal may be detected according to the method described above, and then the modulation depths of the one-frequency-multiplication components are determined according to a detection result. To avoid repetition, details are not described herein again.

Then, the pilot operating point of the MZ modulator is compared with the first threshold, that is, whether the pilot operating point falls within the linear area or the non-linear area is determined, and then the dominant component for the pilot operating point is determined. If the pilot operating point is less than the first threshold (the pilot operating point falls within the linear area), the one-frequency-multiplication component is dominant, and a role of the two-frequency-multiplication component is relatively small, and may be omitted. A corresponding initial amplitude is determined based on the correspondence between the modulation depth of the one-frequency-multiplication component and the initial amplitude of the pilot signal, and an expected target modulation depth (for example, 0.001% to 20%). In other words, the target modulation depth is substituted into the correspondence, to determine the corresponding initial amplitude.

If the pilot operating point is greater than or equal to the first threshold (the pilot operating point falls within the non-linear area), the two-frequency-multiplication component is dominant, and a role of the one-frequency-multiplication component is relatively small, and may be omitted. A corresponding initial amplitude is determined based on the correspondence between the modulation depth of the two-frequency-multiplication component and the initial amplitude of the pilot signal, and an expected target modulation depth (for example, 0.001% to 20%).

Finally, the pilot generation apparatus may generate an appropriate pilot signal according to a result (for example, a target initial amplitude of the pilot signal) that is output by the pilot locking apparatus, and finally lock the modulation depth of the pilot signal at the expected modulation depth (for example, 2%).

Optionally, in another embodiment, after the pilot operating point that is currently on the response curve and that is of the optical modulator is determined, if the value of the pilot operating point is less than a value of a target pilot operating point, the pilot operating point may be further adjusted to the target pilot operating point, where the value of the target pilot operating point is greater than or equal to the first threshold.

For example, after the current pilot operating point of the MZ modulator is determined, if the pilot operating point is not ideal, the pilot operating point may be adjusted to the target pilot operating point. For example, when the MZ modulator performs QPSK modulation, a bias point is at a zero point, full-scale modulation makes eye opening the maximum, and in this case, the target pilot operating point is required to be greater than 90%. Specifically, a gain of an electrical signal that is output by the data driver may be changed, to adjust the pilot operating point of the MZ modulator. In this way, intersymbol interference can be reduced, thereby increasing modulation efficiency.

Specifically, the gain of the electrical signal that is output by the data driver may be changed, to adjust the pilot operating point of the MZ modulator. Specifically, a pilot signal whose initial amplitude is $\xi_1$ may be applied, to accordingly obtain a modulation depth $m_{1f}^1$ of the one-frequency-multiplication component. Then, a pilot signal whose initial amplitude is $\xi_2$ is applied, to accordingly obtain a modulation depth $m_{1f}^2$ of the one-frequency-multiplication component. Then, $k=(m_{1f}^1-m_{1f}^2)/(\xi_1-\xi_2)$ is compared with a relationship (a corresponding slope $k_0$) between the modulation depth of the one-frequency-multiplication component for the target pilot operating point and the pilot signal. If $k>k_0$, the data driver is controlled to increase the gain of the electrical signal, and k is determined again based on this, until $k \leq k_0$.

Optionally, in another embodiment, the first threshold is a value in a range of 50% to 100%, the target modulation depth is a value in a range of 0.001% to 20%, and the value of the target pilot operating point is a value in a range of 80% to 100%.

Figure 7:
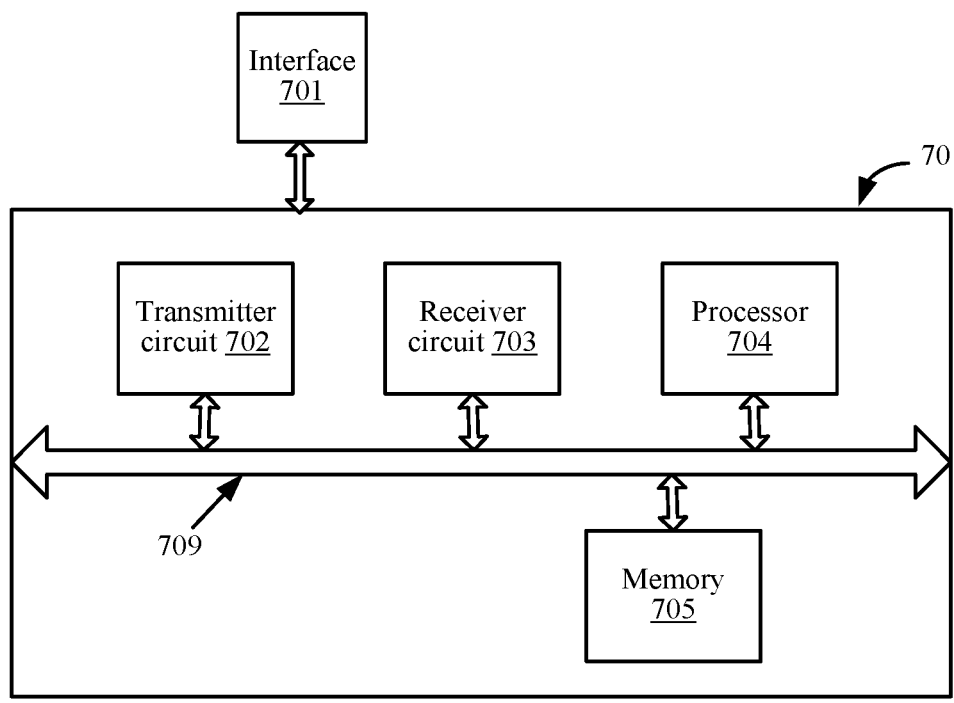
FIG. 7 is a schematic block diagram of a pilot locking apparatus according to another embodiment.

FIG. 7 is a schematic block diagram of a pilot locking apparatus according to another embodiment.

The pilot locking apparatus 70 in FIG. 7 may be configured to implement the steps and the method in the foregoing method embodiment. In the embodiment in FIG. 7, the pilot locking apparatus 70 includes an interface 701, a transmitter circuit 702, a receiver circuit 703, a processor 704, and a memory 705. The processor 704 controls an operation of the pilot locking apparatus 70, and may be configured to process a signal. The memory 705 may include a read-only memory and a random access memory, and provides an instruction and data to the processor 704. The transmitter circuit 702 and the receiver circuit 703 may be coupled to the interface 701. Components of the pilot locking apparatus 70 are coupled together by means of a bus system 709, where in addition to a data bus, the bus system 709 further includes a power bus, a control bus, and a status signal bus. However, for purpose of clear description, various types of buses in the figure are all marked as the bus system 709.

Specifically, the memory 705 may store an instruction for performing the following process:

determining a pilot operating point that is currently on a response curve and that is of an optical modulator, where the optical modulator is configured to modulate, an electrical service flow signal into which an electrical pilot signal is loaded, onto an optical signal, to generate an optical service flow signal; and if a value of the pilot operating point is less than a first threshold, determining a target initial amplitude of the electrical pilot signal based on a correspondence between a modulation depth of a one-frequency-multiplication component of an optical pilot signal that is output after the electrical pilot signal is modulated by the optical modulator and the initial amplitude of the electrical pilot signal, and a target modulation depth of the optical pilot signal; or if a value of the pilot operating point is greater than or equal to a first threshold, determining a target initial amplitude of the electrical pilot signal based on a correspondence between a modulation depth of a two-frequency-multiplication component of an optical pilot signal that is output after the electrical pilot signal is modulated by the optical modulator and the initial amplitude of the electrical pilot signal, and a target modulation depth of the optical pilot signal.

Based on the foregoing technical solution, in this embodiment, a dominant component, that is, a one-frequency-multiplication component or a two-frequency-multiplication component, of a pilot signal in this modulation process is determined according to a pilot operating point of an optical modulator. Subsequently, a target initial amplitude of the pilot signal that is needed to obtain a target modulation depth is determined according to a relationship between a modulation depth of the dominant component and an initial amplitude of a pilot, and therefore an initial amplitude of the pilot signal may be adjusted to the target initial amplitude. In this way, the pilot modulation depth may be quickly and effectively adjusted, and then the pilot can be locked at an expected modulation depth, thereby ensuring accuracy of detecting a status of an optical channel.

In addition, due to a non-linear feature of the optical modulator, after non-linear transfer by the optical modulator, a relationship between power of a pilot signal and an amplitude of the pilot signal is unstable and unpredictable, that is, the pilot is unlocked. Consequently, the status of the optical channel cannot be learned by detecting the pilot signal. According to the method in this embodiment, the pilot can be quickly and effectively locked at the expected modulation depth, and then the accuracy of detecting the status of the optical channel can be ensured.

It should be understood that, the pilot operating point that is currently on the response curve and that is of the optical modulator is for a modulated object as a whole. It should also be understood that, the value of the pilot operating point refers to a ratio of a light field strength corresponding to the pilot operating point to a light field strength corresponding to a vertex of the response curve.

It should also be understood that, the modulation depth refers to a ratio of an amplitude of a signal to power of the signal. The modulation depth of the one-frequency-multiplication component refers to a ratio of the amplitude of the one-frequency-multiplication component of the optical pilot signal to power of the optical pilot signal, and the modulation depth of the two-frequency-multiplication component refers to a ratio of the amplitude of the two-frequency-multiplication component of the optical pilot signal to the power of the optical pilot signal. The amplitude of the pilot signal corresponds to the power of the service flow signal in real time. Therefore, when a pilot is locked at an expected modulation depth, the amplitude of the pilot signal can correspond to the power of the service flow signal in real time, and then a status of an optical channel may be learned by detecting the pilot signal.

The first threshold is an empirical value determined according to a response feature of the optical modulator. If the pilot operating point is less than the first threshold, it indicates that the optical modulator currently operates in a linear operating area. In this case, the one-frequency-multiplication component of the pilot signal plays a dominant role in this modulation process. Therefore, the target initial amplitude of the pilot signal that is needed to obtain the target modulation depth may be determined according to a correspondence between the modulation depth of the one-frequency-multiplication component of the pilot signal and the initial amplitude of the pilot signal.

If the pilot operating point is greater than or equal to the first threshold, it indicates that the optical modulator currently operates in a non-linear operating area. In this case, the two-frequency-multiplication component of the pilot signal plays a dominant role in this modulation process. Therefore, the target initial amplitude of the pilot signal that is needed to obtain the target modulation depth may be determined according to a correspondence between the modulation depth of the two-frequency-multiplication component of the pilot signal and the initial amplitude of the pilot signal.

Optionally, in an embodiment, the memory 705 may further store an instruction for performing the following process:

obtaining modulation depths of one-frequency-multiplication components of N optical pilot signals that are output after the electrical pilot signal is modulated by the optical modulator, where the modulation depths of the one-frequency-multiplication components of the N optical pilot signals correspond one-to-one to initial amplitudes of N electrical pilot signals, and N is an integer greater than 1; and determining the pilot operating point that is currently on the response curve and that is of the optical modulator according to the modulation depths of the one-frequency-multiplication components of the N optical pilot signals, the initial amplitudes of the N electrical pilot signals, and the correspondence between the modulation depth of the one-frequency-multiplication component of the optical pilot signal that is output after the electrical pilot signal is modulated by the optical modulator and the initial amplitude of the electrical pilot signal.

Optionally, in another embodiment, the memory 705 may further store an instruction for performing the following process:

determining the correspondence between the modulation depth of the one-frequency-multiplication component of the optical pilot signal that is output after the electrical pilot signal is modulated by the optical modulator and the initial amplitude of the electrical pilot signal according to a transfer function of the optical modulator, or determining the correspondence by emulating or testing the optical modulator.

Optionally, in another embodiment, the memory 705 may further store an instruction for performing the following process:

determining the correspondence between the modulation depth of the two-frequency-multiplication component of the optical pilot signal that is output after the electrical pilot signal is modulated by the optical modulator and the initial amplitude of the electrical pilot signal according to a transfer function of the optical modulator, or determining the correspondence by emulating or testing the optical modulator.

Optionally, in another embodiment, the memory 705 may further store an instruction for performing the following process:

the first threshold is a value in a range of 50% to 100%, the target modulation depth is a value in a range of 0.001% to 20%, and the value of the target pilot operating point is a value in a range of 80% to 100%.

It should be understood that sequence numbers of the foregoing processes do not mean execution sequences in various embodiments. The execution sequences of the processes should be determined according to functions and internal logic of the processes, and should not be construed as any limitation on the implementation processes of the embodiments.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A transmitter, comprising:
    a pilot loading apparatus configured to generate an electrical pilot signal and load the electrical pilot signal to an electrical service flow signal;
    an optical modulator configured to modulate the electrical service flow signal onto an optical signal to generate an optical service flow signal; and
    a pilot locking apparatus configured to determine a target initial amplitude of the electrical pilot signal and a pilot operating point that is currently on a response curve and that is of the optical modulator, and control the pilot loading apparatus to adjust an initial amplitude of the electrical pilot signal to the target initial amplitude,
    wherein in response to a value of the pilot operating point being less than a first threshold, the target initial amplitude of the electrical pilot signal is determined based on a correspondence between a modulation depth of a one-frequency-multiplication component of an optical pilot signal that is output after the electrical pilot signal is modulated by the optical modulator and the initial amplitude of the electrical pilot signal, and a target modulation depth of the optical pilot signal, or
    wherein in response to a value of the pilot operating point being greater than or equal to a first threshold, the target initial amplitude of the electrical pilot signal is determined based on a correspondence between a modulation depth of a two-frequency-multiplication component of an optical pilot signal that is output after the electrical pilot signal is modulated by the optical modulator and the initial amplitude of the electrical pilot signal, and a target modulation depth of the optical pilot signal.

2. The transmitter according to claim 1, wherein the electrical pilot signal is a first electrical pilot signal of N electrical pilot signals, and the optical pilot signal is a first optical pilot signal of N optical pilot signals; and
    wherein the pilot locking apparatus is configured to determine the target initial amplitude of the electrical pilot signal and the pilot operating point by being configured to:
        obtain a plurality of modulation depths of a plurality of one-frequency-multiplication components of the N optical pilot signals that are output after the first electrical pilot signal is modulated by the optical modulator, wherein the plurality of modulation depths of the plurality of one-frequency-multiplication components of the N optical pilot signals correspond one-to-one to initial amplitudes of the N electrical pilot signals, and N is an integer greater than 1; and
        determine the pilot operating point that is currently on the response curve and that is of the optical modulator according to the plurality of modulation depths of the plurality of one-frequency-multiplication components of the N optical pilot signals, an initial amplitude of each of the N electrical pilot signals, and, with respect to an optical pilot signal in the N optical pilot signals and an electrical pilot signal in the N electrical pilot signals, the correspondence between the modulation depth of the one-frequency-multiplication component of the optical pilot signal that is output after the electrical pilot signal is modulated by the optical modulator and the initial amplitude of the electrical pilot signal.

3. The transmitter according to claim 1, wherein the correspondence between the modulation depth of the one-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

4. The transmitter according to claim 1, wherein the correspondence between the modulation depth of the two-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

5. The transmitter according to claim 1, wherein the pilot locking apparatus is further configured to adjust the pilot operating point to a target pilot operating point, wherein the value of the target pilot operating point is greater than or equal to the first threshold in response to the value of the pilot operating point being less than a value of the target pilot operating point.

6. The transmitter according to claim 1, wherein the first threshold is a value in a range of 50% to 100%.

7. The transmitter according to claim 1, wherein the target modulation depth is a value in a range of 0.001% to 20%.

8. The transmitter according to claim 1, wherein the pilot locking apparatus is further configured to adjust the pilot operating point to a target pilot operating point, and the value of the target pilot operating point is a value in a range of 80% to 100%.

9. A pilot locking apparatus, comprising a processor and a non-transitory computer-readable storage medium containing instructions when being executed by the processor to cause the processor to perform operations including:
    determining a pilot operating point that is currently on a response curve and that is of an optical modulator, wherein the optical modulator is configured to modulate, an electrical service flow signal into which an electrical pilot signal is loaded, onto an optical signal, to generate an optical service flow signal; and
    in response to a value of the pilot operating point being less than a first threshold, determining a target initial amplitude of the electrical pilot signal based on a correspondence between a modulation depth of a one-frequency-multiplication component of an optical pilot signal that is output after the electrical pilot signal is modulated by the optical modulator and an initial amplitude of the electrical pilot signal, and a target modulation depth of the optical pilot signal; and
    in response to a value of the pilot operating point being greater than or equal to a first threshold, determining a target initial amplitude of the electrical pilot signal based on a correspondence between a modulation depth of a two-frequency-multiplication component of the optical pilot signal that is output after the electrical pilot signal is modulated by the optical modulator and the initial amplitude of the electrical pilot signal, and a target modulation depth of the optical pilot signal.

10. The pilot locking apparatus according to claim 9, wherein the electrical pilot signal is a first electrical pilot signal of N electrical pilot signals, and the optical pilot signal is a first optical pilot signal of N optical pilot signals, and wherein the instructions when being executed by the processor to cause the processor to perform determining a pilot operating point that is currently on a response curve and that is of an optical modulator comprises instructions when being executed by the processor to cause the processor to perform operations including:

obtaining a plurality of modulation depths of a plurality of one-frequency-multiplication components of the N optical pilot signals that are output after the first electrical pilot signal is modulated by the optical modulator, wherein the plurality of modulation depths of the plurality of one-frequency-multiplication components of the N optical pilot signals correspond one-to-one to initial amplitudes of the N electrical pilot signals, and N is an integer greater than 1; and determining the pilot operating point that is currently on the response curve and that is of the optical modulator according to the plurality of modulation depths of the plurality of one-frequency-multiplication components of the N optical pilot signals, an initial amplitude of each of the N electrical pilot signals, and, with respect to an optical pilot signal in the N optical pilot signals and an electrical pilot signal in the N electrical pilot signals, the correspondence between the modulation depth of the one-frequency-multiplication component of the optical pilot signal that is output after the electrical pilot signal is modulated by the optical modulator and the initial amplitude of the electrical pilot signal.

11. The pilot locking apparatus according to claim 9, wherein the correspondence between the modulation depth of the one-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

12. The pilot locking apparatus according to claim 9, wherein the correspondence between the modulation depth of the two-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

13. The pilot locking apparatus according to claim 9, wherein the first threshold is a value in a range of 50% to 100%, the target modulation depth is a value in a range of 0.001% to 20%, the pilot locking apparatus is further configured to adjust the pilot operating point to a target pilot operating point, and the value of the target pilot operating point is a value in a range of 80% to 100%.

14. A method, comprising:

determining a pilot operating point that is currently on a response curve and that is of an optical modulator, wherein the optical modulator is configured to modulate, an electrical service flow signal into which an electrical pilot signal is loaded, onto an optical signal, to generate an optical service flow signal;

in response to a value of the pilot operating point being less than a first threshold, determining a target initial amplitude of the electrical pilot signal based on a correspondence between a modulation depth of a one-frequency-multiplication component of an optical pilot signal that is output after the electrical pilot signal is modulated by the optical modulator and an initial amplitude of the electrical pilot signal, and a target modulation depth of the optical pilot signal;

in response to a value of the pilot operating point being greater than or equal to a first threshold, determining a target initial amplitude of the electrical pilot signal based on a correspondence between a modulation depth of a two-frequency-multiplication component of an optical pilot signal that is output after the electrical pilot signal is modulated by the optical modulator and an initial amplitude of the electrical pilot signal, and a target modulation depth of the optical pilot signal; and adjusting the initial amplitude of the electrical pilot signal to the target initial amplitude.

15. The method according to claim 14, wherein the electrical pilot signal is a first electrical pilot signal of N electrical pilot signals, and the optical pilot signal is a first optical pilot signal of N optical pilot signals; and wherein the determining a pilot operating point that is currently on a response curve and that is of an optical modulator comprises:

obtaining a plurality of modulation depths of a plurality of one-frequency-multiplication components of the N optical pilot signals that are output after the first electrical pilot signal is modulated by the optical modulator, wherein the plurality of modulation depths of the plurality of one-frequency-multiplication components of the N optical pilot signals correspond one-to-one to initial amplitudes of the N electrical pilot signals, and N is an integer greater than 1; and determining the pilot operating point that is currently on the response curve and that is of the optical modulator according to the plurality of modulation depths of the plurality of one-frequency-multiplication components of the N optical pilot signals, an initial amplitude of each of the N electrical pilot signals, and, with respect to an optical pilot signal in the N optical pilot signals and an electrical pilot signal in the N electrical pilot signals, the correspondence between the modulation depth of the one-frequency-multiplication component of the optical pilot signal that is output after the electrical pilot signal is modulated by the optical modulator and the initial amplitude of the electrical pilot signal.

16. The method according to claim 14, wherein the correspondence between the modulation depth of the one-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

17. The method according to claim 14, wherein the correspondence between the modulation depth of the two-frequency-multiplication component of the optical pilot signal that is output after the electrical pilot signal is modulated by the optical modulator and the initial amplitude of the electrical pilot signal is determined according to a transfer function of the optical modulator, or is determined by emulating or testing the optical modulator.

18. The method according to claim 14, wherein after the determining a pilot operating point that is currently on a response curve and that is of an optical modulator, the method further comprises:

in response to the value of the pilot operating point being less than a value of a target pilot operating point, adjusting the pilot operating point to the target pilot operating point, wherein the value of the target pilot operating point is greater than or equal to the first threshold.

19. The method according to claim 14, wherein the first threshold is a value in a range of 50% to 100%, the target modulation depth is a value in a range of 0.001% to 20%, the method further comprises adjusting the pilot operating point to a target pilot operating point, and the value of the target pilot operating point is a value in a range of 80% to 100%.

\* \* \* \* \*